United States Patent Office 3,524,750
Patented Aug. 18, 1970

3,524,750
STARCH ADHESIVES AND THEIR PREPARATION
Jean-Marc Billy, Outremont, Quebec, Canada, assignor to The Ogilvie Flour Mills Company Limited, Montreal, Quebec, Canada, a Canadian company
No Drawing. Filed Apr. 25, 1969, Ser. No. 819,465
Int. Cl. C09j 3/06
U.S. Cl. 106—213
12 Claims

ABSTRACT OF THE DISCLOSURE

A starch adhesive composition prepared by an improved no-carrier process in which granular starch is added to an aqueous caustic solution at a temperature at which substantially no swelling of the starch occurs, gradually raising the temperature to initiate swelling of the starch and permitting the swelling to continue until the desired, specified viscosity is attained. The adhesive composition so-obtained is of a smooth and substantially uniform consistency, and is well-suited for use in the manufacture of laminated and corrugated paperboard.

---

This invention relates, broadly, to a process for preparing starch adhesives; more particularly, it is concerned with a new and improved process for preparing starch adhesives utilising a single homogeneous composition composed of partially swollen starch granules. The starch adhesives prepared in accordance with this invention are particularly well suited for use in the manufacture of laminated and corrugated paperboard, the two principal commercial forms of paperboard.

At the present time, corrugated paperboard is manufactured in a continuous operation in which a heat-setting adhesive is applied, in a first stage, to the tips of a heated fluted paper interlayer which is then contacted, under heat and pressure, with a strip of liner paper to form a strong adhesive bond between the two layers. The resulting flexible paperboard is known in the art as single faced material. To form a rigid corrugated paperboard, additional adhesive is applied to the exposed, fluted tips, in a second operation, and a second strip of liner paper is brought into contact with the fluted interlayer and bonded thereto, under heat and pressure, employing a double backer machine.

Starches of different types have been extensively used for many years as the heat-setting adhesive in the manufacture of corrugated and other sorts of paperboard. Conventionally, these starch adhesives consist of two fractions, one called the primary or carrier portion, the other the secondary fraction. The primary fraction contains cooked or gelatinised starch which serves as the suspension medium or carrier for the raw starch of the secondary fraction. The two fractions are normally prepared separately in two containers and then mixed. For example, the carrier starch is usually cooked at relatively high temperatures in the presence of alkali, while the secondary starch is prepared in a separate container by mixing an aqueous slurry of raw, i.e. uncooked, starch, with borax at a temperature below the gelatinisation temperature. The cooked starch is then added to, and thoroughly mixed with, the raw starch slurry with the cooked starch serving as a suspension medium or carrier for the raw starch portion so that it can be transported to the corrugating machine and applied to the corrugating medium.

As an alternative to this conventional so-called "carrier process," starch corrugating adhesives may be made by a process involving only one lot of starch which, in principle, results in an adhesive composed of an essentially homogeneous mass of partially swollen starch granules, rather than the conventional, two-component carrier formulation. In this process, as described in several publications, all of the starch granules are slurried in water, and then sufficient alkali is added to produce an incipient pasting. The starch is allowed to swell, without becoming completely gelatinised, until the viscosity of the starch reaches a desired level which is appropriate for the end use envisaged for the starch adhesive. The amount of alkali used is carefully controlled. When the starch swells sufficiently to give the desired viscosity, the swelling is arrested, for instance, by the addition of a phenolic compound such as resorcinol.

A "no-carrier" process of this sort, whilst offering certain advantages over the conventional carrier process, is not particularly convenient, especially when, as is customary, it is conducted in an actual corrugating plant. Thus, the process as presently envisaged demands the separate preparation, again requiring two containers, of a starch slurry and a caustic solution with the addition of the formula water in two lots, one to form the starch slurry and the other to form the caustic solution. Also, the starch adhesives so obtained are often variable in quality.

In practice, it is found that the operating conditions require careful control (cf. Tappi, vol. 50, No. 8, 1967, p. 58A). Thus, very strict control of the temperature both of the starch slurry and the caustic solution is necessary, to obtain a controlled rate of viscosity increase. Indeed, even with careful temperature control, it is generally found that accurate and reliable control of the viscosity can only be obtained through an automatic regulator located in the vessel and comprising a sensing viscometer and means for automatically introducing a stopper into the reaction mixture to arrest the starch swelling at a predetermined viscosity level; and this equipment is expensive. Also, the rate of caustic addition to the starch slurry is very critical, and the caustic solution should be added slowly, at a uniform rate, with good agitation, in order to prevent over-swelling and gelatinisation of starch granules in localised areas of the slurry. Even when the caustic is added slowly with good stirring, there is still a marked propensity for localised gelatinisation to occur at the point of addition. Such localised gelatinisation results in a two-component formulation comprising a suspension of raw, ungelatinised starch granules suspended in a solution of gelatinised starch derived from the dissolution of the spot gels under the mixing action that prevails in the reaction vessel. Consequently, the product so-obtained is often variable in adhesive properties. In short, it will be readily recognized that the rigorous control of temperature and the careful, slow addition of the caustic, as well as the specialised equipment needed in the no-carrier process as hitherto described and conducted, militate against the suitability and acceptance of the process for widespread application in the paperboard industry.

The present invention is concerned with a new and improved no-carrier process for preparing a starch adhesive, and its primary object is to provide a rapid and simplified no-carrier procedure which:

(a) is especially well suited to, and convenient for, continuous operation in a corrugated paperboard factory; and (b) results in a product which is relatively uniform in quality with excellent adhesive and water-holding properties and viscosity stability.

This primary object of the invention is attained by practising, in combination, the following sequence of essential process steps:

(i) preparing an aqueous caustic solution;
(ii) adding granular starch to the solution rapidly and uninterruptedly;

(iii) raising the temperature of the resulting mixture whereupon the starch granules swell so thickening the mixture;

(iv) permitting the swelling to continue until a Zahn #3 viscosity of 12 to 60 seconds, preferably 20 to 30 seconds, is attained; and (v) abruptly terminating the swelling and concomitant thickening by adding a reaction stopper to the mixture thereby completing formation of the starch adhesive.

In practising the invention, all the formula water, all the caustic and all the starch are added, in that order, to a single mixing tank. In a preferred procedure, a definite calculated amount of caustic is dissolved in the formula water and the solution preheated to around 70° F. simply to minimise variations resulting from differences in water temperature in summer and winter. The starch is then added uninterruptedly and as rapidly as possible to the caustic solution which is continuously agitated during, and subsequent to, the addition. At this stage, there is virtually no swelling of the starch so that the viscosity remains stable at around 8 Zahn #3 seconds and the slurry may, if required, be stored indefinitely.

Swelling of the individual starch granules is initiated by raising the slurry temperature, conveniently by direct steam injection. The temperature at which swelling of the individual starch granules becomes pronounced varies, depending primarily on the ratio of caustic to starch to water. Advantageously, a ratio is selected, conveniently by adjusting the caustic concentration, which will provide an appropriate degree of swelling at a temperature in the range of between about 102° to about 110° F., preferably between about 103° to about 105° F. A temperature in the foregoing broad range is convenient for it corresponds to the normal storage and operating temperature in pasteboard factories. Moreover, it is generally associated with a gradual and, therefore, readily controllable swelling, when the caustic level is properly adjusted, such that, over a short period of time, say, 10 to 15 minutes, the viscosity reaches the desired level, as measured by a Zahn cup viscometer #3, of 12 to 60 seconds, preferably 20 to 30 seconds. A viscosity within the broad range is appropriate to a mass of only partially swollen starch granules.

The concentration of caustic required to swell the starch to the desired extent at a temperature within this range normally varies between 0.5 percent and 0.8 percent based on the weight of the water, and depending on the type and the amount of starch used. Preferably, the proportions of the caustic, starch and water fall within the following ranges, the actual proportions in a given instance depending again on the type of starch used and the concentration desired.

| | Parts |
|---|---|
| Water | 180–300 |
| Caustic | 1–3.5 |
| Starch | 40–80 |

While it is generally convenient to arrange for the viscosity to increase steadily over a definite, short period, for then the rise in viscosity can be readily monitored by a paperboard factory operator simply using a cup viscometer, it is also possible to increase the viscosity more rapidly by raising the temperature a few degrees above the temperature in the foregoing range at which swelling initially becomes pronounced. Similarly, by lowering the temperature a degree or two, the rate of swelling can be decreased. In other words, the rate of swelling can be adjusted to any desired level by either raising or lowering the final temperature by a degree or so.

As indicated hereinbefore, in the process of this invention, raw starch is chemically treated to produce a homogeneous suspension of partially swollen starch granules. When the viscosity reaches the desired, preselected level, which is associated with partial, rather than complete swelling, the swelling is stopped by the addition of a reaction stopper to the system. The stopping of the reaction may be achieved in one of several ways, as, for instance, by the addition of water to cool the starch slurry, or a reagent that, in neutralising the caustic, effectively lowers the concentration below the critical concentration required for swelling. Examples of suitable, neutralising agents include alum, hydrochloric acid, sodium bisulfate, sodium acid phosphate, sulfamic acid, sodium bicarbonate and magnesium sulfate. Borax is another suitable stopper which offers the advantage that it facilitates the obtention of an adhesive with a good water holding capacity which readily cures into a rigid gel forming an instantaneous bond at the corrugating machine. However, it is generally preferred to employ borax in combination with a stronger neutralising agent. In this context, a very rapid and effective method of terminating the swelling reaction, and imparting the sought after water-binding properties to the adhesive, is to add a mixture of alum and borax in powdered form to the thickened slurry. After addition of the reaction stopper, the viscosity of the slurry drops to about 20 to 30 Zahn #3 seconds which is optimum for the use of the adhesive.

As to the starch reactant which may be employed in the process of this invention, in general, any commercially available starch is suitable. Examples include corn starch, wheat starch (which is preferred because it exhibits a progressive swelling pattern), tapioca starch and the like, and chemically modified ungelatinised starches such as acid-modified starches, oxidised starches and chemical derivatives of starch such as the starch ethers described in our co-pending application, Ser. No. 413,984, filed Nov. 25, 1964. As for the caustic, the preferred material is sodium hydroxide but other alkaline materials such as potassium hydroxide may be employed.

The starch adhesive so-obtained are particularly well-suited for use in the manufacture of paperboard and, as will be readily apparent, are conveniently prepared within the actual factory, as and when required, for direct use or storage. The adhesive usually has a starch solids content of between about 12 and about 30 percent by weight (dry), a pH of between about 9 and 12, a gel temperature of between about 131° and 161° F. and a viscosity of between about 12 and 30, preferably 15 to 25, Zahn #3 seconds.

To obtain a water-resistant adhesive, a water-dispersible resin, such, for example, as a phenol-formaldehyde, urea-formaldehyde or an acetone formaldehyde resin may simply be added to, and dispersed in, the finished, viscosity-stable adhesive. Suitably, the water-dispersible resin should be added in an amount of between about 2% and 15%, preferably 3% to 8%, by weight based on the initial starch weight.

The invention is further described, by way of illustration only, in and by the following examples. In these examples, reference is made to the gel temperature and Zahn #3 viscosity. The gel temperature measurements were made following the standard procedure described at page 16 of Special Tech. Assoc. Publ. No. 3, Tappi, 1965. The viscosity measurements were made by means of a Zahn #3 cup viscometer which is a bullet-shaped, stainless steel cup with an orifice in its base; the viscosity of the starch adhesive, when meaured by the Zahn #3 viscometer, is expressed in Zahn #3 seconds; that is, the time required for a definite volume (44 cc.) of the material to flow through the orifice in the bottom of the metal cup.

EXAMPLE 1

4.8 g. of sodium hydroxide flakes were added to 850 ml. of water at 75° F., and 180 g. of pearl wheat starch added rapidly and uninterruptedly in one lot to give a slurry having a stable Zahn #3 viscosity of 8 seconds. The slurry, while being continuously agitated, was heated by direct steam injection, to 104° F., at which temperature the slurry began to thicken, and after 10 minutes the viscosity had risen to 26 seconds Zahn #3. The swelling was stopped by adding a powdered mixture of 1.32 g. of aluminum sulfate octadecahydrate and 4.20 g. of 10 mole borax and mixing for ten minutes. The Zahn #3 viscosity dropped to a stable level of 16 seconds. The gel temperature of the finished adhesive was 143–145° F., the pH was 11.3 and the starch solids content (dry basis) was 15.5 percent.

EXAMPLE 2

A slurry was prepared by adding 180 g. of pearl corn starch to 850 ml. of water at 750 F. containing 6.4 g. dissolved sodium hydroxide flakes. On warming to 105° F. by direct steam injection, the viscosity increased to a Zahn #3 value of 27 seconds, after 30 minutes of mixing. Addition of 1.32 g. of aluminum sulfate octadecahydrate and 5.2 of 10 mole borax followed by 10 minutes of mixing gave an adhesive with a Zahn #3 viscosity of 27 seconds. The gel temperature of the finished adhesive was 147° F., the pH was 11.4 and the starch solids content was 15.5 precent.

EXAMPLE 3

A slurry was prepared following the procedure described in Example 1, and allowed to thicken to 26 seconds Zahn #3. The addition of 0.925 g. of anhydrous sodium bicarbonate brought the viscosity down to 17 seconds after 2 minutes of mixing. Addition of 4.2 g. of 10 mole borax followed by 10 minutes of mixing finished the adhesive. The viscosity was stable at 17 Zahn #3 seconds, the gel temperature was 140° F., the pH was 11.4 and the starch solids content was 15.5 percent.

EXAMPLE 4

The preparation of a slurry and its thickening was effected following the procedure described in Example 1, and the reaction was terminated by addition of 0.655 g. of anhydrous magnesium sulfate and 4.2 g. of 10 mole borax. The adhesive was very stable; it had a Zahn #3 viscosity of 18 seconds a gel temperature of 142° F., a pH of 11.3 and a starch solids content of 15.5 percent.

EXAMPLE 5

The preparation and thickensing of a slurry was effected following the procedure described in Example 1, and the reaction was completed by adding 1.07 g. of sulfamic acid and 4.2 g. of 10 mole borax. The finished adhesive was perfectly stable, and had a Zahn #3 viscosity of 17 seconds, a gel temperature of 140° F., a pH of 11.4 and a starch solids content of 15.5 percent.

EXAMPLE 6

A thickened slurry with a Zahn #3 viscosity of 27 seconds was prepared following the procedure described in Example 1. It was treated with 7.20 g. of 10 mole borax, and the resulting mix diluted with an additional 50 ml. of water to give a final Zahn #3 viscosity of 18 seconds, a gel temperature of 140° F., a pH of 11.3 and a starch solids content of 15.5 percent.

EXAMPLE 7

This example illustrates the preparation of a wheat starch corrugating adhesive in which sodium acid phosphate and borax are used to stop the swelling and control the gel temperature.

A wheat starch slurry was prepared following the procedure described in Example 1 and allowed to thicken to 27 Zahn #3 seconds by heating to 105° F. The swelling was then stopped by adding 1.52 g. of sodium dihydrogenphosphate monohydrate and 4.2 g. of 10 mole borax, and the adhesive thoroughly mixed for 10 minutes. The finished adhesive had a stable viscosity of 18 Zahn #3 seconds, a gel temperature of 140° F., a pH of 11.4 and a starch solids content of 15.5 percent.

EXAMPLE 8

This example illustrates the use of hydrochloric acid and borax to stop the swelling stage during the preparation of a wheat starch adhesive according to the invention:

To an alkaline wheat starch slurry prepared and allowed to thicken to 26 Zahn #3 seconds as described in Example 1 was added 11 ml. of IN HCl and 4.2 g. of 10 mole borax. After mixing to dissolve the borax completely, an adhesive was obtained which had a visocsity of 18 Zahn #3 seconds, a gel temperature of 140° F., a pH of 11.5 and a starch solids content of 15.5 percent.

EXAMPLE 9

This example illustrates the preparation of a wheat starch waterproof adhesive, using a commercially available dry urea-formaldehyde resin ("Cascamite"), according to the invention:

The addition of 5% by weight "Cascamite" resin to the starch formulation of Example 1 afforded an adhesive essentially identical with the parent product, but which cured to give a water resistant bond that remained intact after 24 hours of immersion of the adhesively bonded paper in water at room temperature.

EXAMPLE 10

This example illustrates the preparation of a wheat starch water-resistant adhesive, using a commercially available acetone-formaldehyde resin ("Ketac").

A slurry containing 180 g. of wheat starch, 850 ml. water and 4.8 g. of sodium hydroxide was prepared following the procedure of Example 1. The slurry was heated to 180°–110° F. and, after 7 minutes at this temperature, the viscosity had risen to 26 Zahn #3 seconds. Thereafter, 1.32 g. of powdered alum and 4.20 g. 10 mole borax were added to the slurry. This addition terminated the swelling, and caused the pH to drop from about 11.6 for the original alkaline slurry to 11.3 and the viscosity to fall to the stable level of 15 Zahn #3 seconds. After mixing for 10 minutes, 7.2 g. of "Ketac" resin (a liquid acetone-formaldehyde resin containing 65% solids) was added to the formulation. The addition of the resin caused no appreciable alteration in the viscosity or pH. This adhesive showed excellent pot life remaining at the same viscosity on standing overnight. The gel temperature of this adhesive was 146° F. It cured to give a water-resistant bond that remained intact after 24 hours of immersion of the adhesively bonded paper in water at room temperature.

EXAMPLE 11

The procedure described in this example was that employed in a paperboard factory under actual manufacturing conditions.

425 imperial gallons of water were run into a conventional mixing tank fitted with a steam injection line and a simple pump to transfer the finished adhesive to storage. 24 lbs. of sodium hydroxide in flake form was added and the solution stirred, while heating with steam to 70° F., to dissolve the caustic. Thereafter, 900 lbs. of wheat starch were added rapidly and without interruption over a 5 minute period, then the mixture was heated to 104° F. by direct steam injection while stirring constantly. On attaining that temperature, the Zahn #3 viscosity was about 8 seconds. The mix was held at 104° F. until the Zahn #3 viscosity rose to 26–27 seconds; the time required was about 10–15 minutes, which gave the operator sufficient time to enable him to effectively control the swelling. Immediately this viscosity was attained, 6 lbs. of alum in about 3 gallons of hot water were added, and mixed for two minutes, the solution having been prepared in advance in order to be available for addition at this point. There was then added, 16 lbs. of 5 mole borax (or 21 lbs. of 10 mole borax), and the whole was mixed for 10 minutes before pumping to storage. About 500 imperial gallons of adhesive were obtained having the following properties:

Zahn #3 viscosity—15 seconds
Gel temperature—144° to 146° F.
Starch solids content—15.5 percent The adhesive had a very stable viscosity, being unaffected by the shear action of the circulating pump.

The procedure described in this example has proved highly successful under actual plant conditions, and in trials the adhesive paste has been employed in making both single faced (flexible) and double backed (rigid) corrugated boards at machine speeds ranging from about 200 to 550 feet per minute. Because of the very short texture of the adhesive, the glue roll settings had to be reduced from about 10 thousandths to about 5 thousandths of an inch. Both types of corrugated board obtained with this adhesive were acceptable in all respects.

The procedure described is subject to variation in a number of ways. Thus, the alum can be replaced with a wide variety of compounds that effectively neutralise the caustic, for example, hydrochloric acid, sodium bisulfate, sodium acid phosphate, sulfamic acid, sodium bicarbonate, magnesium sulfate and many others. Alternatively, the alum can be omitted completely and the amount of borax augmented, for instance, by about 70 percent. A very convenient and efficacious method of terminating the swelling is to add a mixture of alum and borax in powdered form, and mix for about 10 minutes before pumping to storage.

The foregoing examples are all directed to applicant's new, rapid and simplified no-carrier process whereby superior and more uniform swelling of the starch granules is accomplished quickly and conveniently, and with the minimum of control. As pointed out above, in the preferred procedure, the required quantity of caustic is dissolved in water and the solution is preheated to about 75° F. to eliminate any problem arising from differences in water temperature in winter and summer. The order of addition, in respect to the starch and caustic, is a critical factor in the overall success of our invention. Thus, if, following prior practice, the caustic is added directly to the starch slurry, even slowly, it is difficult to avoid overswelling and gelatinisation of individual starch granules in localised areas of the slurry corresponding to points of addition. These gelatinised granules arise from contact, at addition points, between the concentrated caustic and individual starch granules in the interval before the caustic is dispersed throughout the starch slurry. On spot gelatinisation, the starch granules disintegrate and enter into solution so resulting in a two-component system containing both solubilised starch and ungelatinised, or raw, starch. The solubilised, i.e. gelatinised, starch granules are not available for subsequent swelling and gelatinisation at the time of formation of the adhesive bond, which can affect adhesive quality. The propensity for localised gelatinisation is greatly reduced when a mass of starch granules is added directly to an agitated, caustic solution at the preparation temperatures employed in practising this invention. This is verified by the following comparative examples in which a starch adhesive is made by a defined procedure after which, in each instance, the adhesive was centrifuged at 14,000 r.p.m. for 15 minutes, the supernatant decanted and evaporated to dryness so as to determine content of solubilised starch, and the sediment layer weighed to obtain the weight of the partially swollen, undissolved starch layer which is an indication of the swelling capacity of the adhesive.

EXAMPLE A

This adhesive was made following the procedure of Example 1 hereinbefore:

| | Percent |
|---|---|
| Solubles in supernatant | 2.19 |
| Adhesive in sediment layer | 66 |

EXAMPLE B

This adhesive was made following a prior art procedure in which a caustic solution containing 4.80 g. of sodium hydroxide in 177 ml. water at 130° F. was slowly added, with steady agitation, to 180 g. of wheat starch suspended in 678 ml. of water preheated to 95° F. The temperature was raised by steam injection to 105° F. until the viscosity rose to 29 Zahn #3 seconds. 6.6 ml. of 20 percent alum solution (1.32 g.) were added and mixed for two minutes, followed by 4.2 g. of 10 mole borax. Final viscosity was 17 Zahn #3 seconds.

| | Percent |
|---|---|
| Solubles in supernatant | 2.93 |
| Adhesive in sediment layer | 60 |

EXAMPLE C

This adhesive was made by a conventional carrier process as follows:

36 g. of wheat starch are added to 320 g. water, and the resulting slurry heated to 155° F. 20 ml. of 16% aqueous sodium hydroxide (3.2 g. sodium hydroxide) are added, and the mixture stirred for 15 minutes. Thereafter, 550 ml. of cold water are added to reduce the temperature to 102° F., followed by 144 g. of wheat starch. The slurry is mixed for 20 minutes then the formulation completed by the addition of 2.87 g. of 10 mole borax and 10 minutes mixing. The adhesive so-obtained had a gel temperature of 147° F. and a viscosity of 20 Zahn #3 seconds.

| | Percent |
|---|---|
| Solubles in supernatant | 4.4 |
| Adhesive in sediment layer | 30 |

In practising this invention, it is also crucially important to add the starch uninterruptedly and as rapidly as possible to the caustic solution, since intermittent additions of starch also cause localised gelatinisation, and can result in an unsatisfactory or inferior adhesive. Under plant conditions, as described in Example 11 herein, the starch was added at the rate of nine 100 lb. bags over a 5 minute period.

The new process, aside from affording a starch adhesive of high and uniform quality, offers a number of important advantages over previously described no-carrier processes, including the following:

The equipment required for the process is simply a mixing tank fitted with a steam injection line and a pump to transfer the adhesive to storage, and standard equipment is perfectly adequate. Thus, the mixing tanks encountered in corrugating plants to prepare the regular, carrier type of adhesives are well suited to the present process without adaptation. Further, no automatic viscosity measuring or other devices such as temperature regulators are required, and the thickening of the starch slurry may be conveniently and effectively monitored by means of a standard and relatively inexpensive cup viscometer. Of course, the process can be readily automated to arrest the swelling at the appropriate viscosity level, if this is so desired.

Another important feature about the present process is the use of a low temperature during the preparation of the starch slurry, thus permitting all the water, caustic and starch to be measured out at one time. Warming the slurry at a steady rate ensures an even and progressive swelling of all the granules so providing a more uniform adhesive. The process is easily followed and controlled manually as the critical caustic addition step requiring special mixing equipment, and, desirably, a temperature regulator, is eliminated.

The procedure, involving addition of all the formula water, caustic and starch at the beginning, is simplified; this, and the replacement of a step involving the slow and careful addition of caustic by one calling for the rapid and uninterrupted addition of starch, results in substantial savings in the time required for the process so permitting an increase in productivity which usually is an important consideration to the paperboard industry.

The resultant adhesive is completely stable to viscosity breakdown commonly caused by circulating pumps. Its texture is very "short" so permitting faster machine speeds in the manufacture of the paperboard. Corrugators should be adjusted to 3–5 thousandths of an inch to yield thinner glue lines and better mileage, i.e. coverage. The boards obtained are less prone to warping and show little or no washboarding, and the same adhesive may be used for both single facer and double backer operations.

Since certain further and additional modifications and changes may be made in the embodiments described, the foregoing description is to be interpreted as illustrative only and the invention is defined solely by and in the appended claims.

I claim:

1. In a no-carrier process for making an adhesive composition particularly suitable for use in the manufacture of laminated and corrugated paperboard comprising the commingling of ungelatinized starch, water and caustic to produce swelling of substantially all starch granules and terminating the swelling by adding a reaction stopper, that improvement comprising
   (i) adding starch uninterruptedly to an aqueous solution of the caustic at a temperature at which substantially no swelling occurs;
   (ii) raising the temperature of the resulting slurry to initiate swelling of the starch so thickening the slurry; and
   (iii) permitting the swelling to continue until a Zahn #3 viscosity of 12 to 60 seconds is attained.

2. Process as claimed in claim 1 wherein the temperature of said resulting slurry is raised to a point in the range of about 102° F. to about 110° F. by steam injection and said slurry is held at a temperature in said range until a Zahn #3 viscosity of 20 to 30 seconds is attained before terminating the swelling.

3. Process as claimed in claim 1 wherein the temperature of said resulting slurry is raised to a point in the range of about 103° F. to about 105° F. by steam injection and said slurry is held at a temperature in said range for a short period, then raising the temperature a few degrees until a Zahn #3 viscosity of 20 to 30 seconds is attained before terminating the swelling.

4. A process as claimed in claim 1, wherein the temperature of the slurry is raised gradually and uninterruptedly by direct steam injection until a Zahn #3 viscosity of 20 to 30 seconds is attained.

5. A process as claimed in any one of claim 1, wherein the proportions of the adhesive-forming ingredients are as follows:

| | Parts |
|---|---|
| Water | 180–300 |
| Caustic | 1–3.5 |
| Starch | 40–80 |

6. A process as claimed in any one of claim 1, wherein the reaction stopper used to terminate the swelling and concomitant thickening of the slurry is selected from the group consisting of alum, borax, hydrochloric acid, sodium bisulfate, sodium acid phosphate, sulfamic acid, sodium bicarbonate and magnesium sulfate.

7. A process as claimed in any one of claim 1, wherein the reaction stopper used to terminate the swelling and concomitant thickening of the slurry is a solution of alum and borax.

8. A process as claimed in any one of claim 1, wherein the reaction stopper used to terminate the swelling and concomitant thickening of the slurry is a solution of magnesium sulfate and borax.

9. A process as claimed in any one of claim 1, wherein the reaction stopper used to terminate the swelling and concomitant thickening of the slurry is a solution of sulfamic acid and borax.

10. A process as claimed in any one of claim 1, wherein the reaction stopper used to terminate the swelling and concomitant thickening of the slurry is a solution of sodium acid phosphate and borax.

11. A process for making a corrugating adhesive comprising forming a solution of 24 lbs. of caustic soda in 425 gallons of water, warming the solution to about 70° F., adding 900 lbs. of starch to the solution rapidly and without interruption, heating the resultant slurry by direct steam injection to a temperature of about 104° F., permitting the slurry to thicken at about 104° F. for about 10 to 15 minutes to a Zahn viscosity of 26 to 27 seconds, and adding alum and borax to terminate the thickening and complete the formation of the adhesive.

12. Process as claimed in claim 1 wherein said starch is in granular form.

References Cited

UNITED STATES PATENTS

| 2,884,389 | 4/1959 | Corwin et al. | |
| 2,886,541 | 5/1959 | Langlois et al. | |
| 3,308,037 | 7/1967 | Goos et al. | 127—71 |
| 3,355,307 | 11/1967 | Schoenberger | 106—213 |

JULIUS FROME, Primary Examiner

L. B. HAYES, Assistant Examiner

U.S. Cl. X.R.

117—156; 127—71